(12) United States Patent
Chandrasekaran et al.

(10) Patent No.: US 12,491,703 B2
(45) Date of Patent: Dec. 9, 2025

(54) INTERACTIVE SYSTEM FOR A VEHICLE

(71) Applicant: SAINT-GOBAIN GLASS FRANCE, Courbevoie (FR)

(72) Inventors: Naveinah Chandrasekaran, Tamil Nadu (IN); Balasubramaniyan N, Tamil Nadu (IN); Robin C Jayaram, Kerala (IN); Arunvel Thangamani, Tamil Nadu (IN)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 627 days.

(21) Appl. No.: 17/440,042

(22) PCT Filed: Mar. 31, 2020

(86) PCT No.: PCT/IN2020/050306
§ 371 (c)(1),
(2) Date: Sep. 16, 2021

(87) PCT Pub. No.: WO2020/202203
PCT Pub. Date: Oct. 8, 2020

(65) Prior Publication Data
US 2022/0185110 A1    Jun. 16, 2022

(30) Foreign Application Priority Data

Apr. 4, 2019    (IN) .............................. 201941013638

(51) Int. Cl.
*B32B 17/10* (2006.01)
*B60K 35/10* (2024.01)
(Continued)

(52) U.S. Cl.
CPC .. *B32B 17/10036* (2013.01); *B32B 17/10541* (2013.01); *B60K 35/10* (2024.01);
(Continued)

(58) Field of Classification Search
CPC ...................................................... B60K 35/00
See application file for complete search history.

(56) References Cited

U.S. PATENT DOCUMENTS

2008/0158096 A1 * 7/2008 Breed ..................... G06V 20/59
340/436
2013/0009569 A1 * 1/2013 Knibbe ................ H05B 47/115
315/297
(Continued)

FOREIGN PATENT DOCUMENTS

IN    201741007887 A    8/2018
KR    101955879 B1 *    3/2011
WO    WO 2007/122426 A1    11/2007

OTHER PUBLICATIONS

Google Machine translation of IN201741007887A (Year: 2017).*
(Continued)

*Primary Examiner* — Jean Paul Cass
(74) *Attorney, Agent, or Firm* — Pillsbury Winthrop Shaw Pittman LLP (57) ABSTRACT

An interactive system for a vehicle using a display unit integrated on the windshield. The system receives user inputs and control the display unit based on the user input is disclosed. The system includes a display unit, which is present on the windshield of the rear window glazing, side window glazing or roof glazing of a vehicle. The display unit is composed of one or more illumination devices sandwiched between a first substrate and a second substrate of the glass assembly. The display unit is configured to display patterns, emoticons with varying intensity of illumination, frequency and color. The system further includes a sensor unit with a plurality of sensors that monitors condition and status of the vehicle. The processing unit is configured to
(Continued)

control the display unit based on user actions and data received from the data retrieving unit.

18 Claims, 9 Drawing Sheets

(51) Int. Cl.
   *B60K 35/22* (2024.01)
   *B60K 35/28* (2024.01)
   *B60K 35/60* (2024.01)
   *B60K 35/80* (2024.01)
   *B60K 35/81* (2024.01)
   *B60K 35/85* (2024.01)

(52) U.S. Cl.
   CPC .............. *B60K 35/22* (2024.01); *B60K 35/60* (2024.01); *B60K 35/81* (2024.01); *B32B 2457/20* (2013.01); *B32B 2605/08* (2013.01); *B60K 35/28* (2024.01); *B60K 35/80* (2024.01); *B60K 35/85* (2024.01); *B60K 2360/119* (2024.01); *B60K 2360/168* (2024.01); *B60K 2360/332* (2024.01); *B60K 2360/56* (2024.01); *B60K 2360/589* (2024.01); *B60K 2360/592* (2024.01); *B60K 2360/785* (2024.01)

(56) References Cited

U.S. PATENT DOCUMENTS

| | | | |
|---|---|---|---|
| 2015/0077237 A1 | 3/2015 | Chou et al. | |
| 2016/0159282 A1 | 6/2016 | Kurihara | |
| 2021/0221346 A1* | 7/2021 | Boehm | B60T 7/042 |
| 2022/0080827 A1* | 3/2022 | Sung | B60K 35/10 |
| 2023/0118340 A1* | 4/2023 | Husain | B60W 50/14 |
| | | | 701/27 |

OTHER PUBLICATIONS

Google Machine Translation of CN107206754B (Year: 2015).*
Google Machine translation of KR101955879B1 (downloaded on Aug. 15, 2024) to Knibbe (Year: 2011).*
KR International Search Report as issued in International Patent Application No. PCT/IN2020/050306, dated Aug. 1, 2020.

* cited by examiner

INTERACTIVE SYSTEM FOR A VEHICLE

CROSS-REFERENCE TO RELATED APPLICATIONS

This application is the U.S. National Stage of PCT/IN2020/050306, filed Mar. 31, 2020, which in turn claims priority to Indian patent application number 201941013638 filed Apr. 4, 2019. The content of these applications are incorporated herein by reference in their entireties.

TECHNICAL FIELD

The present disclosure relates generally to a display provided in the laminated glass of a windshield and in particular, to an interactive system using the windshield of a vehicle.

BACKGROUND

Background description includes information that may be useful in understanding the present disclosure. It is not an admission that any of the information provided herein is prior art or relevant to the presently claimed invention, or that any publication specifically or implicitly referenced is prior art.

Automotive laminated glass comprising two sheets of rigid material such as glass sheet is already known. The glass sheets are connected together by a thermoplastic interlayer sheet usually comprising of polyvinyl butyral (PVB). Automotive laminated glass may be used in windscreens, rear windows, side windows, opening and non-opening roofs, rear-view mirrors or protective glass for headlamps.

Automotive glazings are particularly designed to provide the driver a view of the forward region of the vehicle during driving and rearward region of the vehicle during reversing and other maneuvers. More recently, automobile laminated glass has shown a trend to incorporate functional elements such as LED and EL into the laminated glass for lighting units, indicator lights etc. Typically, the insertion of light-emitting diodes (LEDs) into automotive laminated glass is limited to light indicators and internal lighting functionalities. Existing LED based displays are not interactive and does not respond to the control system of the vehicle and other remote control devices.

There exists laminated glazing incorporating electroluminescent device, because of its longer operational life and diffusive lighting properties. WO2007122426 provides one example of such automobile glazing. It discloses a laminated glazing, in the form of a roof window comprising an electrical device in the form of an electroluminescent lamp integrated in the laminate construction. Further, US20160159282 provides a plurality of rectangular organic electroluminescent displays laminated in the laminated glass. However, the electroluminescent device integrated in the laminated glazing as mentioned in the above prior arts is only for lighting and/or aesthetic purpose. In addition, the above-mentioned prior arts also fail to disclose the details of electroluminescent device. However, using such normal electroluminescent device does not provide features such as safety, electrical insulation and mechanical integrity in case of damages.

Indian patent application 201741007887 discloses a method of integration of electroluminescent layers within the interlayers of a laminated glazing by printing or depositing, thereby providing safety and electrical insulation. However, the patent application does not teach an interactive system that communicates with the engine control unit of the vehicle and server to display real-time status on the windshield.

Typically, user views status and alert messages about a vehicle on the dashboard. There exist scenarios where the user desires to update status on the windshield on a real-time basis. Current display units or display devices does not enable such interactive display on the windshield. There do not exist a system that provides an interactive display to provide real-time updates and notifications on the interior and/or exterior of the windshield.

Existing high-end vehicles include control systems (also known as engine control unit) and automation systems. Automated control systems provide ease of use to passengers and ensures efficiency in operating vehicle components. However, existing control systems of vehicles have many shortcomings. For example, control systems lack the ability to communicate with the windshield of a vehicle and display real-time values and user preferred settings. Further, the control system display does not communicate with a remote control device, such as a mobile phone or smart key to provide alerts on the windshield of the vehicle. Thus, it is required to have an interactive system that provides seamless communication with all devices in the vehicle (including ECU, sensor unit and remote control units) to update real-time status of the devices on a windshield.

Hence, it would be desirable to provide an interactive system incorporating display devices on the laminated glazing for displaying information on the interior and exterior of the vehicle. In addition, it is necessary to propose an interactive system that provides seamless communication with all devices in the vehicle (including ECU, sensor unit and remote control units) to update real-time status of the devices on a windshield. Further, there is a need for an interactive device that enables a user to configure alerts/notifications on the windshield.

SUMMARY OF THE DISCLOSURE

One aspect of the present disclosure provides an interactive system for a vehicle using the windshield for display. Another object of the present invention is to provide a windshield that communicates with the engine control unit (ECU) of the vehicle. The interactive system communicates with one or more sensors present in the vehicle to display status of the one or more sensors on the windshield. Another object of the present invention is to provide an interactive system that receives inputs from the user to display alerts corresponding to the inputs on the windshield. The interactive system also receives data from the remote control devices to activate a display on the windshield.

Another aspect of the present disclosure is to provide an interactive system for a vehicle using a display unit integrated on the windshield. The system receives user inputs and control the display unit based on the user input. The system comprises a display unit present on the windshield of the vehicle. The display unit is composed of one or more illumination devices sandwiched between a first substrate and a second substrate of the laminated glazing. The display unit is configured to display patterns, emoticons with varying intensity of illumination, frequency and color. The system further comprises a sensor unit with a plurality of sensors that monitors condition and status of the vehicle. The system further includes a data acquisition unit that is configured to receive data from one or more sensors present in the vehicle. The data acquisition unit further converts analog data received from the one or more sensors into digital data.

The output from the data acquisition unit is transmitted to the processing unit. The processing unit receives data from at least one of the sensor unit, data acquisition unit, and remote control device. The processing unit is configured to control the display unit based on user actions and data received from the data retrieving unit.

According to an embodiment of the present disclosure, a method of providing interactive display for a vehicle using a display unit is disclosed. An output data from a sensor unit present in the vehicle is received by a data acquisition unit. The output data from the data acquisition unit is processed and transmitted to a processing unit. The processing unit receives user inputs from an input device. The user input include voice, touch, gesture and the like. A command signal is generated in response to the output data. The command signal further controls the display unit to display patterns, emoticons on at least exterior of the vehicle or interior of the vehicle or both.

Thereafter, the remote control device establishes communication with the processing unit to control the display unit. The remote control device, when triggered activates/deactivates the display unit. The remote control device also communicates with the display unit to modify the illumination of the display unit based on the proximity thereof. Also, the display unit is triggered by an input device that transmits input signals to the processing unit. The input signals include voice command, touch input, keyboard input, gesture input and the like. Subsequently, in response to at least some of the command signals generated by the processing unit, a status of the user is determined and communicated on the display unit. Also, the status of the user is communicated with a server for providing social feed in networking sites.

Other features and aspects of this disclosure will be apparent from the following description and the accompanying drawings.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the disclosure.

DETAILED DESCRIPTION

The present disclosure is now discussed in more detail referring to the drawings that accompany the present application. In the accompanying drawings, like and/or corresponding elements are referred to by like reference numbers.

Wherever possible, the same reference numbers will be used throughout the drawings to refer to the same or the like parts. The present disclosure is to provide an improved laminated glass for a vehicle incorporating other functions in addition to the usual one. The present disclosure further provides simple and low cost manufacturing and construction method of an improved laminated glass for windshield of a vehicle with new functions. Further, the present disclosure relates to laminated glass for a windshield, a backlite or a sidelite of a vehicle as an anchor for lighting device for display contained within the laminate.

The disadvantages discussed in the background are overcome by an interactive system for a vehicle using the windshield for display. The interactive system provides a windshield that communicates with the engine control unit (ECU) (forming part of the processing unit) of the vehicle. The interactive system communicates with one or more sensors present in the vehicle to display status of one or more sensors on the windshield. Also, the interactive system receives inputs from the user to display alerts corresponding to the inputs on the windshield. The interactive system may also be activated/triggered by a remote control device and/or an input device. Further, the interactive system communicates with a server to transmit outputs from the processing unit thereto.

Figure 1:
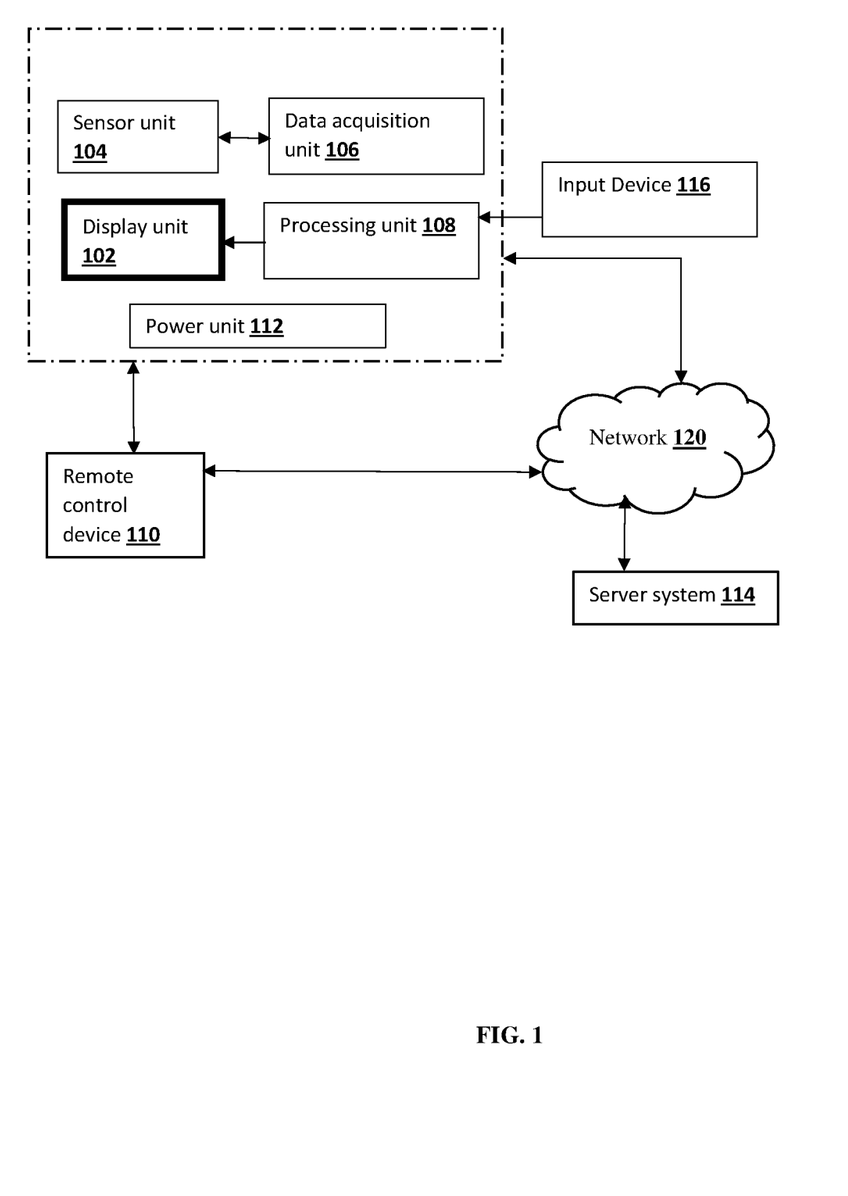
FIG. 1 is a block diagram of the interactive system for a vehicle using a glass assembly according to an embodiment of the present disclosure.

FIG. 1 is a block diagram of the interactive system for a vehicle using a glass assembly, according to an embodiment of the present invention. The interactive system hereafter referred to as a system, is implemented in a vehicle to communicate with automotive components and sensors present in the vehicle and display the information received therefrom on a display unit present in the windshield. The system also receives user inputs and control the display unit based on the user input. The system comprises a display unit 102 present on the windshield of the vehicle. The display unit 102 is composed of one or more illumination devices sandwiched between a first substrate and a second substrate of the laminated glazing. The display unit 102 is configured to display patterns, emoticons with varying intensity of illumination, frequency and color. The display unit is transparent, opaque, semi-transparent and disposed on a visible region of the windshield or disposed behind a ceramic region of the windshield. Further, the display unit 102 is disposed on a visible region of the windshield including zone 'A', zone 'B' and zone 'C'. In another embodiment, the display unit is disposed behind a ceramic region of the windshield.

The system further comprises a sensor unit 104 with a plurality of sensors that monitors condition and status of the vehicle. The plurality of sensors is mounted on suitable parts and/or mechanisms of the vehicle. The sensor is mounted on the exterior or interior of the vehicle. The sensors that are designed to be responsive to the environmental conditions or stimuli outside the vehicle are mounted on the exterior suitable parts of the vehicle and those responsive to stimuli inside the vehicle, such as taximeter, are mounted in the usual interior suitable parts of the vehicle. In an embodiment, display unit integrated in the windshield is configured to display condition detected by sensor unit 104. The one or more sensors are designed for functions including but not limited to temperature, relative air humidity, Wi-Fi strength, location, breathe analyzer (alcohol testing device), luminescence, acoustics and voice recognition. Further, the sensors can be incorporated to perform function including detecting occupancy level, air quality sensor, fuel tank indicator, passenger seat-belt indication, pedal sensor and others. The sensor unit 104 includes a microphone for voice recognition. Further, the sensor unit 104 includes a touch sensor for receiving touch response from a user.

Thus, on receiving output from the sensor unit 104, the display unit indicates values of temperature, relative humidity, Wi-Fi strength, location, alcohol level, illuminance, noise level and air quality on the windshield. The system further includes a data acquisition unit 106 that is configured to receive data from one or more sensors present in the vehicle. The data acquisition unit 106 further converts analog data received from the one or more sensors into digital data.

The output from the data acquisition unit 106 is transmitted to the processing unit 108. The processing unit 108 receives data from at least one of the sensor unit 104, data acquisition unit 106, and remote control device 110. The processing unit 108 is configured to control the display unit based on user actions and data received from the data acquisition unit 106. The processing unit comprises a microprocessor, a memory, a power convertor, an engine control unit, a lighting control unit and a wireless communication module. The processing unit is configured to selectively control at least one or more illumination device in the display unit by providing command signal to the power convertor. Based on the command signal, the display unit is configured to selectively indicate data about fuel indicator, temperature data, seat belt indicator, and thermal comfort data of the vehicle and a combination thereof. Examples of thermal comfort data include noise level, illumination level, operative temperature, PPD and PMV.

In an embodiment, the processing unit communicates with the remote control device 110 using a wireless communication protocol. Examples of wireless communication protocol include Wi-Fi, Bluetooth, NFC, ZIGBEE and the like. In an embodiment, the communication between various components, such as remote control device, the processing unit and the server is established by a communication network 120. Examples of the communication network 106 may include, but are not limited to, the Internet, a cloud network, a Wireless Fidelity (Wi-Fi) network, a Local Area Network (LAN), and/or a Metropolitan Area Network (MAN). The power unit 112 is a DC battery source powering the components in the vehicle. The server is one of an application server, data server or a cloud based server. The input device 116 communicates with the processing unit 108 through a wired or a wireless communication protocol. Examples of input device 116 includes a microphone, a touch screen, a bar code reader, and a gesture unit.

Figure 2:
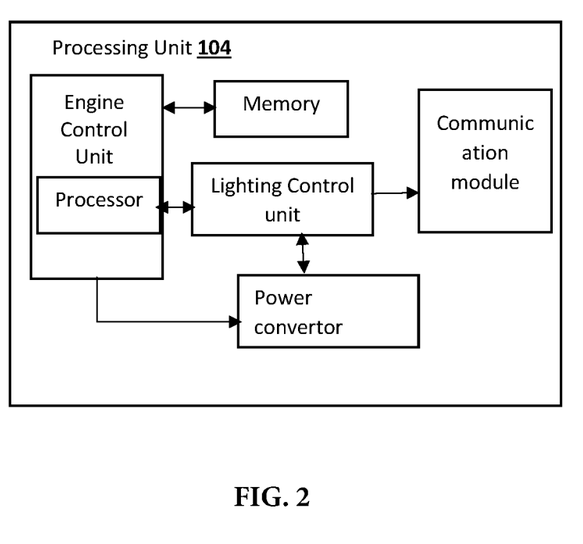
FIG. 2 is a block diagram that illustrates an exemplary processing unit for interactive system according to an embodiment of the present disclosure.

FIG. 2 is a block diagram that illustrates an exemplary processing unit for interactive system. The processing unit 104 includes an engine control unit, a communication module, a light control unit, and a power convertor. The power convertor receives electrical output from the power unit. The electrical output is an AC output or DC output. The engine control unit comprises a processor and a memory. The processor may be any conventional processor, such as commercially available CPUs or hardware-based processor. It will be understood by those of ordinary skill in the art that the processor, computer, or memory may actually comprise multiple processors, computers, or memories that may or may not be stored within the same physical housing.

In various aspects described herein, the processor may be located remotely from the vehicle and further communicate with vehicle wirelessly. In other aspects, some of the processes described herein are executed on a processor disposed within vehicle and others by a remote processor. The memory is configured to store instructions accessible by the processor. Further, the memory includes data that is executed by the processor. Memory is any storage device, a computer-readable medium, or another medium that stores data that may be read with the aid of an electronic device, such as a hard-drive, memory card, ROM, RAM, and write-capable or read-only memories. In an example, data stored in the memory includes detailed map information and traffic pattern model information that may be retrieved, stored or modified by the processor in accordance with instructions.

In an embodiment, the power convertor further includes a power supply unit and power management unit. The power supply can be an AC supply, or DC supply. Further the power management unit may convert AC to DC source.

According to an embodiment of the present invention, the communication between the processor, memory and other components within the processing unit is established by a CAN bus. The Controller Area Network (CAN bus) is a robust vehicle bus standard designed to allow microcontrollers and devices to communicate with each other in applications without a host computer. The Electronic Control Unit (ECU) is any embedded system in automotive electronics that controls one or more of the electrical systems or subsystems in a vehicle.

The processing unit 104 also includes a communication module with antenna for transmission and reception of signals. In an example, a Bluetooth/Wi-Fi module is used for Online Data Acquisition and Management. The communication module is enabled to establish communication with the server via a communication network.

The light control unit is configured to generate command signals based on the power output received from the power convertor and the ECU. The light control unit is configured to display one or more patterns, emoticons, and modify illumination selectively in the one or more illumination devices of the display unit. Further, the command signal is configured to selectively activate or de-activate the one or more illumination devices in the display unit. The light control unit is also configured to regulate the power output to the display unit and thereby modify the duration of illumination, frequency of illumination and luminosity of illumination.

In another example, the command signal is used to control display unit to selectively display sensor data selected from a group of fuel indicator, temperature data, seal-belt indicator, breaking indicator, automotive lights, air bag indicator, door open status, speed alert, heater/defroster, thermal comfort level, in-cabin air quality indication, directional indicators, EV battery charge indicator and a combination thereof.

Figure 3:
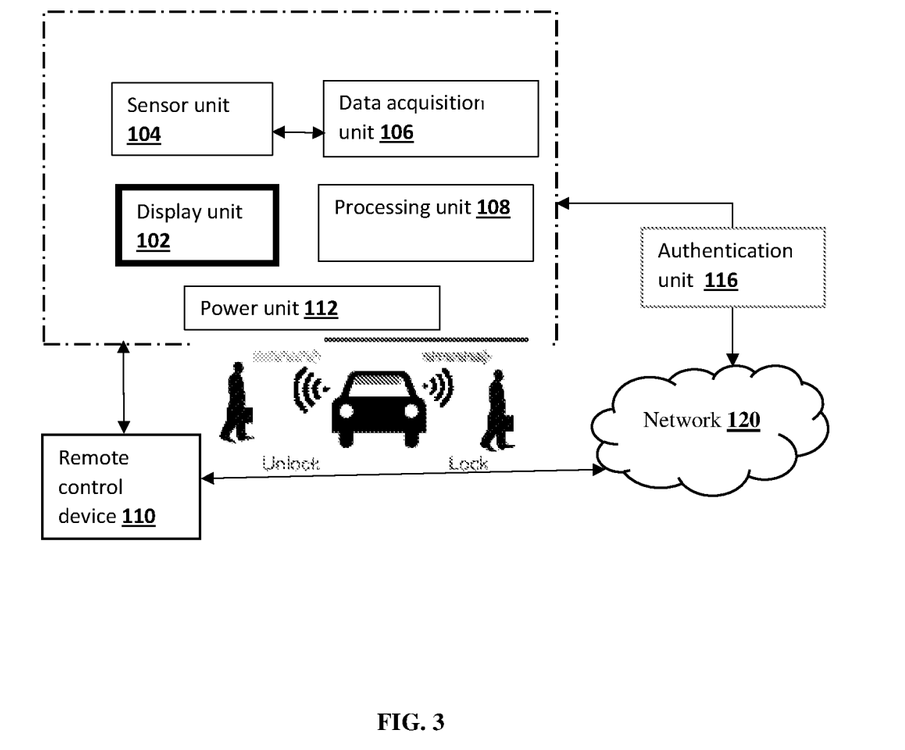
FIG. 3 is a block diagram illustrating an exemplary scenario for implementation of the interactive system for locking or unlocking of a vehicle using a remote control device according to the present disclosure.

FIG. 3 is a block diagram illustrating an exemplary scenario for implementation of the interactive system for locking or unlocking of a vehicle using a remote control device.

The system includes a remote control device 110 and an authentication unit 116 communicatively coupled thereto. The remote control device 110 is at least one of a mobile phone, a laptop, a tablet, a radio frequency reader, and a computing device. The remote control device 110 is communicatively coupled to the processing unit to control locking and unlocking of the vehicle. The remote control device 110 includes a transmitter antenna. The remote control device 110 is connected to the processing unit wirelessly using a communication protocol, for example, Bluetooth, Wi-Fi, and the like. In response to the remote control device 110 establishing a communication with the processing unit 108 in the vehicle, a lighting control signal is generated by the processing unit 108. The light control signal is transmitted to the display unit for illumination. The processing unit estimates the distance of the remote control unit from the vehicle based on the intensity of the communication signal. Based on the distance estimated, the processing unit 108 regulates the power convertor to modify the voltage of light control signal, thus varying the illumination of the display unit. The light control signal can be configured to vary the brightness, frequency, time duration of the display unit. In an example, the light control signal triggers the display unit in the glazing to glow in a custom defined pattern at a specified luminosity level. A pre-defined distance is set for the display unit to act upon the signal received from the remote control device 110.

In another embodiment, the remote control device 110 may be used to establish communication with the processing unit 108 in the vehicle over a communication network 120. Examples of the communication network 120 may include, but are not limited to, the Internet, a cloud network, a Wireless Fidelity (Wi-Fi) network, a Local Area Network (LAN), and/or a Metropolitan Area Network (MAN), Long term evolution (LTE), General packet radio services (2G, 3G, 4G), and Light Fidelity (Li-Fi). The remote control device 110 situated in a remote location can be used to control the display unit and generate alerts. The remote control device 110 is authenticated by an authentication unit 116 prior to establishing communication with the processing unit 108. The authentication unit 116 verifies the user credentials associated with the remote control device 110.

In another embodiment, the remote control device 110 may be triggered to control the display unit. The remote control device 110 may be triggered on events such as burglary, engine ON/OFF, unpleasant weather conditions, tracking of vehicle, and the like.

Figure 4A:
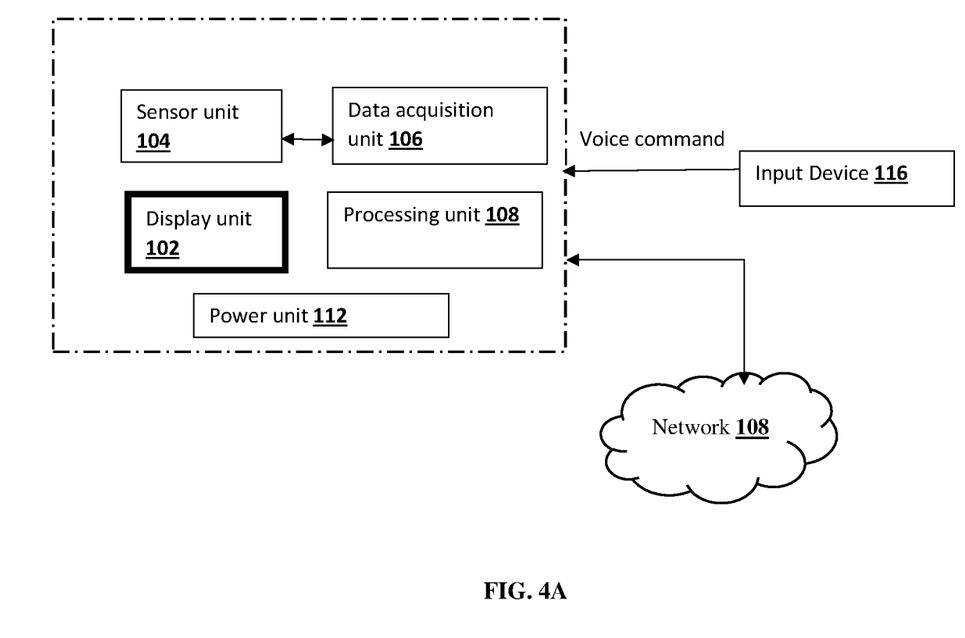
FIG. 4A is a block diagram illustrating an exemplary scenario for implementation of the interactive system receiving response from the input device according to the present disclosure.

FIG. 4A is a block diagram illustrating an exemplary scenario for implementation of the interactive system receiving response from the input device. Examples of input device includes a microphone, a touch screen, a bar code reader, and a gesture unit. In an example, when the input device is a microphone, a voice command is received in an analog form, which is further converted to a digital form. The voice command is transmitted to the processing unit. The processing unit maps the voice command to a pre-defined emoticon or pattern and consecutively displays the mapped emoticon or pattern on the display unit. Thus, the interactive display system is triggered by inputs from a user.

The display unit is also configured to display alphanumeric symbols, alphabets, numeric, patterns, symbols and the like.

Figure 4B:
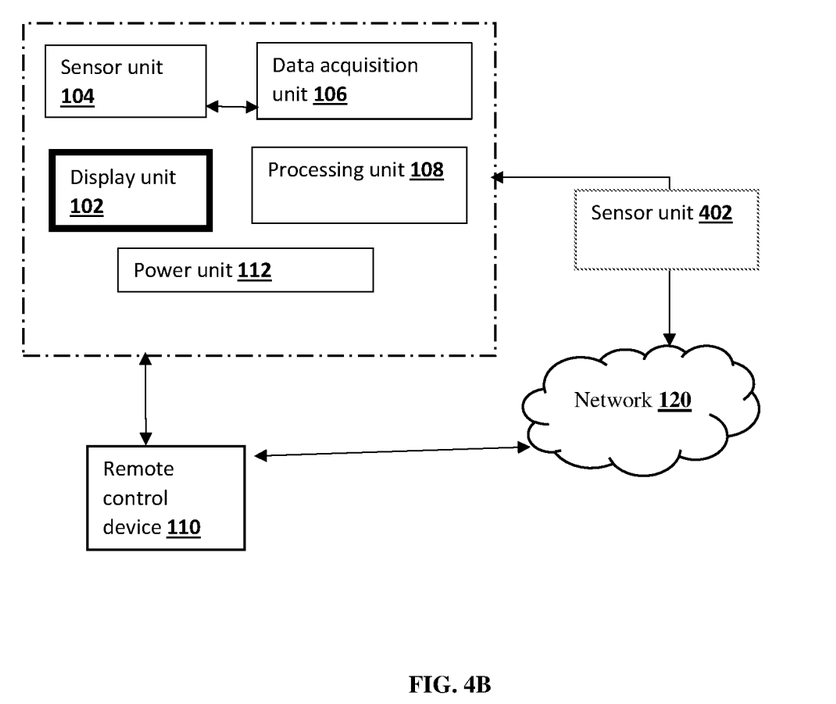
FIG. 4B is a block diagram illustrating an exemplary scenario for implementation of the interactive system receiving response from the remote control device or sensor unit according to the present disclosure.

FIG. 4B is a block diagram illustrating an exemplary scenario for implementation of the interactive system receiving response from the remote device or sensor unit of the vehicle. The sensor unit 402 includes one or more sensors connected to the interactive display system through wires or wirelessly. The sensor unit 402 determines the vehicle conditions and parameters and provides sensor output to the processing unit 108, which is further displayed on the display unit 102.

According to an example, the interactive system can be used to display unhealthy conditions of a driving. During unhealthy driving condition, the transmission from engine is likely to stop shifting, shift too soft/harsh or can cause a complete transmission failure and degradation/crashing of engine performance. The transmission is monitored by using pedal sensors/brake switch which measures brake pedal position to monitor the sudden/number of brakes pushed. A warning limit will be preset in the processing unit for a sudden brakes or frequency of brakes in a given time. Further, the data received from transmission fluid sensor and coolant sensor is used to monitor the engine temperature. When the engine temperature is below a threshold limit, a command signal is transmitted from the processing unit 108 to the display unit 102. The display unit is 'turned ON'. The processing unit 108 can transmit a command signal to activate the display unit in one of the below conditions:

1) use of Gear/Clutch/Acceleration
2) Mass Airflow limits
3) Throttle Position limits
4) Pressure limits of tyre
5) Intake Air Temperature limits
6) Over drive Switch, which monitors the engagement/disengagement of cruise control
7) Speed limits
8) Air condition limits which will affect the Engine RPM
9) Transmission gear value determined by transmission Position Sensor.

The aforementioned conditions are determined by one or sensors in the sensor unit. The processing unit maps the sensor outputs to a pre-defined emoticon or pattern and consecutively displays the mapped emoticon or pattern on the display unit. Thus, the interactive display system is triggered by inputs from the sensor unit. The display unit is also configured to display alphanumeric symbols, alphabets, numeric, patterns, symbols and the like.

According to an example, the interactive system can be used to display the inputs received by the remote control device 110. The Remote control device 110 embedded with a temperature sensor senses the temperature, when driver approaches the car and displays the weather conditions on the display unit on the windshield, which is viewable from outside of the car. Further, the Remote control device 110 can communicate wirelessly to the display unit in the car, to activate illumination on the display unit. Thus, the illumination helps a user for easy tracking of his/her vehicle in crowded/dark spot.

The Remote control device can also activate an authentication notification on the display unit on the glazing. The Remote control device includes a finger print sensor that communicates with the interactive system to display a warning signal on the glazing. In another example, the Remote control device can also activate a 'stand-by' notification on the display unit on the glazing.

Figure 5A:
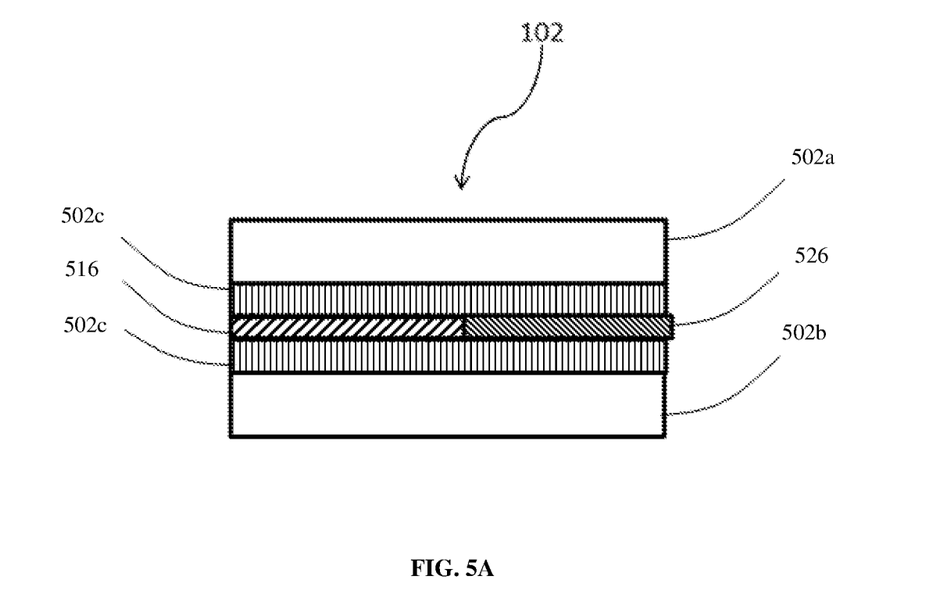
FIG. 5A illustrates an exemplary arrangement of the display unit within the laminated glass of a windshield according to the present disclosure.

FIG. 5A illustrates an exemplary arrangement of the display unit within the laminated glass of a windshield. The laminated glass 502 comprises a first substrate 502a consisting an outer face and a ceramic masked 104 (not shown) inner face, one or more interlayers 502c disposed on the inner face of the first substrate 502a, a second substrate 502b disposed on the interlayer 502c. Further, the laminated glass 502 comprises an illuminating device 516, for example an electroluminescent strip disposed on at least one of the first substrate 502a, a second substrate 502b or the interlayer 502c or a combination thereof. In an embodiment, the laminated glass 502 includes one or more illuminating device 516 disposed therein.

The inner face of the first substrate 502a is masked with ceramic 104 (not shown) only along the periphery. The laminated glass 502 described herein may be utilized in vehicles such as automobiles for glazing such as windshields, windows, sunroof, backlite or sidelites. In another embodiment, the electroluminescent device 516 is placed in the ceramic masked inner face 104 (not shown) of the first substrate 502a to eliminate any degradation in performance due to exposure of UV.

In an embodiment, the first substrate 502a, the second substrate 502b or both the first and the second substrate 502a, 502b may be of glass or polymer. The polymer is polycarbonate (PC) or polypropylene (PP). Optionally, at least the first substrate 502a, the second substrate 502b or both the first and the second substrate 502a, 502b may be strengthened either chemically or thermally. The first substrate 502a, the second substrate 502b or both the first and the second substrate 502a, 502b may have a thickness of at least 0.5 mm.

In an embodiment, one or more interlayer 502c include a polymer. The interlayers 502c comprises a polymer selected from the group consisting of poly vinyl butyral (PVB), polycarbonate, acoustic PVB, ethylene vinyl acetate (EVA), thermoplastic polyurethane (TPU), ionomer, a thermoplastic material, and combinations thereof. The interlayer may have a thickness of at least 0.38 mm. Optionally, the interlayers 502c is modified to accommodate one or more electroluminescent devices 516. Generally, the interlayer 502c is modified to assemble thicker electroluminescent device 516 in the laminated curved article 502. In some instances, the interlayer 502c is modified to accommodate two electroluminescent devices 516 placed on top of each other to display on both the sides of the laminated curved article 502. The interlayer 502c can be modified by heating. In this, the electroluminescent device 516 is disposed on the interlayer 502c by means of a hot stamping tool in which stamping is done by means of physical pressure and at a defined temperature. In some instances, the modification of interlayer 502c by heating method is also done by means of having an adhesive backing in electroluminescent device 516 along with hot stamping to ensure much higher bonding between interlayer 502c and the electroluminescent layer 516.

In an embodiment, the electroluminescent device 516 is disposed between the first substrate 502a and the second substrate 502b, or integral to one or both the first substrate 502a and the second substrate 502b, or disposed between one or more interlayers 502c, or integral to one or more interlayers 502c. The electroluminescent device 516 is either optically transparent, opaque or translucent. The electroluminescent device 516 comprises a material selected from the group consisting of organic or inorganic material. The electroluminescent devices 516 has the luminescence value of at least 1 $Cd/m^2$. The electroluminescent device 516 is integrated in the laminated glass 502 by printing, depositing or patching.

In an embodiment, the electroluminescent device 516 can be directly printed onto the first or second substrate 502a, 502b or the interlayer by means of screen printing with multiple layer onto one another. In another embodiment, the electroluminescent device 516 may be deposited over the first or second substrate 502a, 502b directly either by physical vapor deposition coating or chemical vapor deposition coating. In some instances, the electroluminescent device 516 can be a separate thin film patch which can be fixed by adhesive either on first or second substrate 502a, 502b or on the interlayer 502c. The electroluminescent device 516 has a thickness of at least 5% of interlayer 102c thickness. The electroluminescent device 516 has a thickness of at least 50 µm to 500 µm. In an example, one or more electroluminescent devices 516 of different colors can be integrated in the laminated glass.

In some instances, there can be more than one protective layer and/or insulating layer covering the interlayers. The number of layers are selected based on the amount of insulation necessary for maintaining the electrical and mechanical integrity required for the illumination device.

Figure 5B:
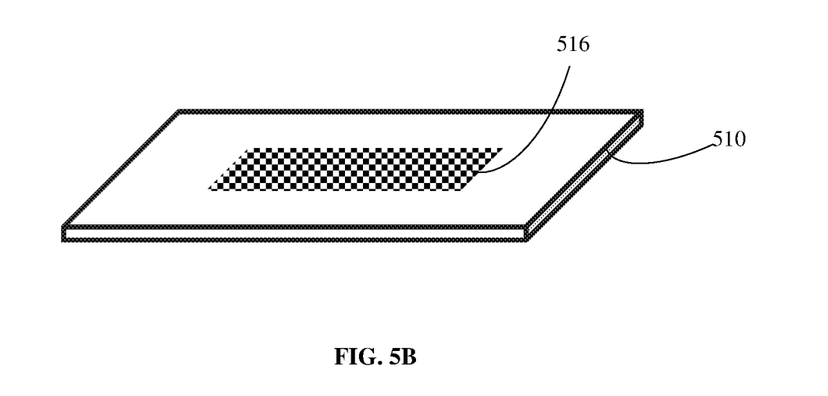
FIG. 5B illustrates an exemplary arrangement of the display unit for use in a backlite or sidelite according to the present disclosure.

FIG. 5B illustrates an exemplary arrangement of the display unit for use in a backlite or sidelite. In another embodiment of the present invention, the display unit is composed of a glass substrate 510. The glass substrate 510 is a tempered glass or a coated glass or a combination thereof. Thereafter, the illuminating device 516 is printed on the glass substrate 510 to form a display unit. In another example, the illuminating device 516 is affixed on the glass substrate 510 by deposition techniques or by using an adhesive. Additionally, the illuminating device 516 is further coated with a protective layer. In yet another embodiment of the present invention, the laminated glass 502 with the illuminating device 516 is encapsulated as a child part on the glass substrate 510 constituting the backlite.

Figure 6:
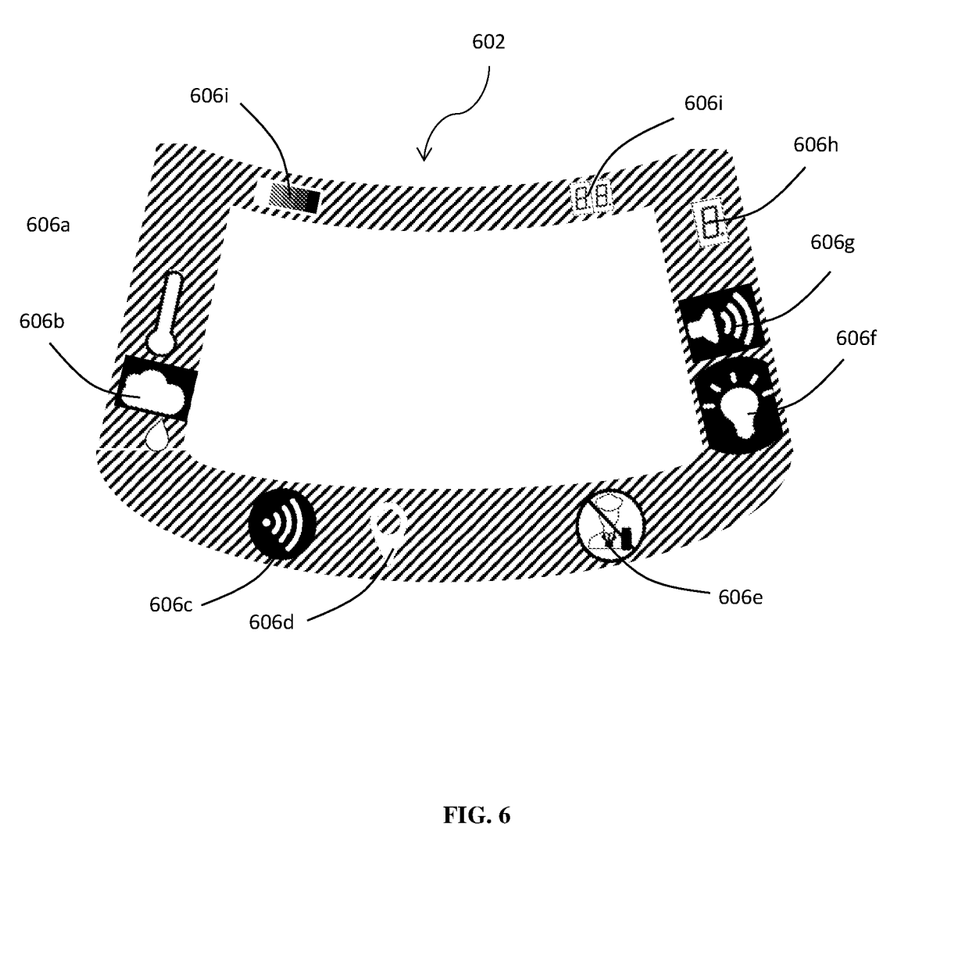
FIG. 6 illustrates a display unit for windshield of a vehicle displaying one or more conditions indicated in the form of pattern, design or other representation according to the present disclosure.

FIG. 6 illustrates a display unit for windshield 602 of a vehicle displaying one or more conditions indicated in the form of pattern, design or other representation 606. The display unit 602 receives signal from the processing unit to selectively active one or more illumination device to display pattern, design or other representation 606a to 606j. The display unit may be triggered by a remote control device, an input device, or by a sensor unit within the vehicle. The processing unit within the vehicle receives signals from at least remote control device, an input device, or by a sensor unit or a combination thereof. Subsequently, in response to the received signals the processing unit selectively activates one or more illumination devices present in the windshield on a real-time basis. The one or more sensors in the sensors unit detect one or more conditions within the vehicle. The one or more sensors are specific for the functions to which they are intended: sensors responsive to the environment temperature sensor, relative air humidity sensor, Wi-fi strength, location, breathe analyzer (alcohol testing device), illuminescence sensor, acoustic sensor, sensors for the function of taximeter, occupancy level sensor, air quality sensor and others. In an example, the laminated glass 602 indicates one or more conditions detected by one or more sensors and enables the one or more electroluminescent devices 516 (shown in FIG. 5) to display characters or designs that indicate temperature 606a, relative humidity 606b, Wi-fi strength 606c, location 606d, alcohol level 606e, illuminance 606f, noise level 606g, taximeter 606h, occupancy number 606i and air quality 606j.

In another example, the processing unit is configured to control the power output to the display unit and thereby modify the duration of illumination, frequency of illumination and luminosity of illumination in the windshield. Further, the processing unit displays pre-defined icons/emoticons on the display unit in response to user actions. Examples of user actions include, but not limited to acceleration, breaking, gear change and voice command. The processing unit identifies the action of breaking and generates a command signal that displays, for example, a smiley face on the display unit.

In an embodiment, optionally one or more electroluminescent devices can be first disposed on the first substrate, second substrate or one or more interlayers before bending. In some instances, optionally one or more interlayers can be modified for accommodating one or more electroluminescent devices.

According to the basic construction described above, the display system and laminated curved article or laminated glass of the present invention may be subject to changes in materials, dimensions, constructive details and/or functional and/or ornamental configuration without departing from the scope of the protection claimed.

Figure 7:
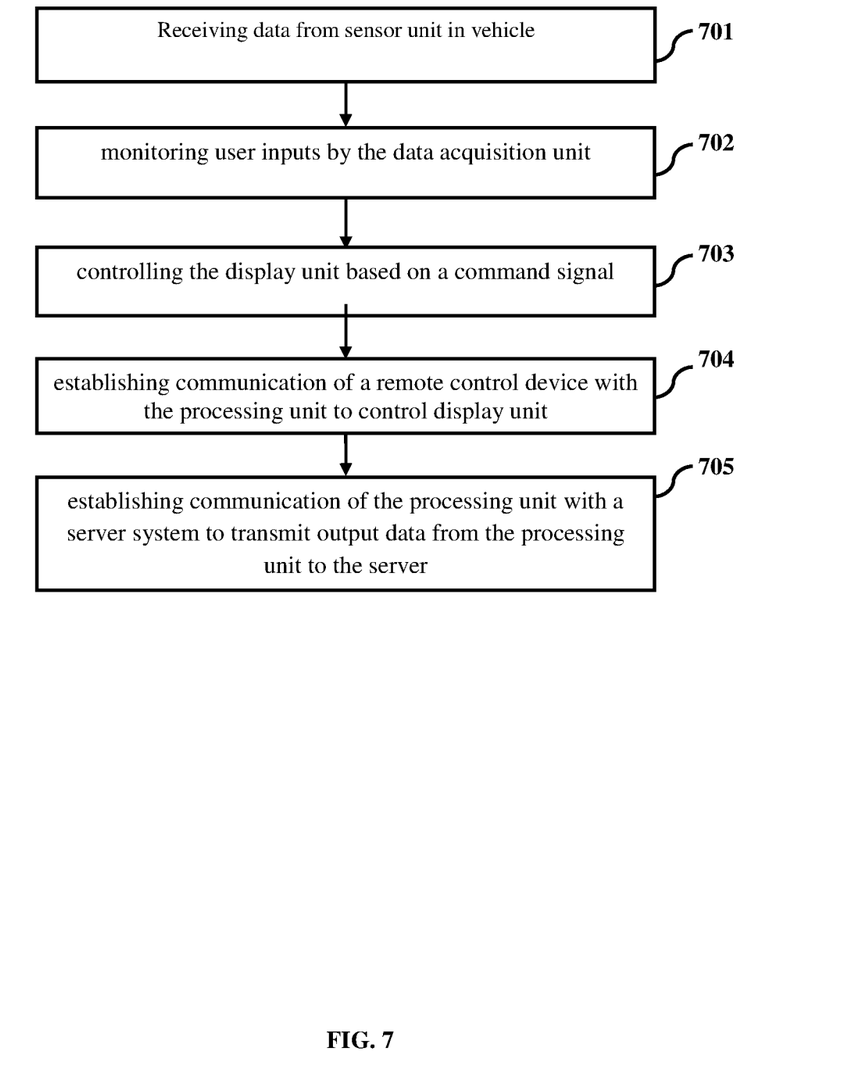
FIG. 7 is a flowchart illustrating an exemplary method of triggering display unit to display emoticons and patterns according to the present disclosure.

FIG. 7 is a flowchart illustrating an exemplary method of triggering display unit to display emoticons and patterns. The method includes receiving data from a sensor unit present in the vehicle by a data acquisition unit (701). The output data from the data acquisition unit is transmitted to a processing unit. The processing unit receives user inputs from an input device (702). The user input include voice, touch, gesture and the like. A command signal is generated in response to the output data. The command signal further controls the display unit to display patterns, emoticons on at least exterior of the vehicle or interior of the vehicle or both (703).

Thereafter, the remote control device establishes communication with the processing unit to control the display unit (704). The remote control device, when triggered activates/de-activates the display unit. The remote control device also communicates with the display unit to modify the illumination of the display unit based on the proximity thereof. Also, the display unit is triggered when an input device transmits input signals to the processing unit. The input signals include voice command, touch input, keyboard input, gesture input and the like. Subsequently, in response to at least some of the command signals generated by the processing unit, a status of the user is determined and communicated on the display unit. Also, the status of the user is communicated with a server for providing social feed in networking sites (705).

Figure 8:
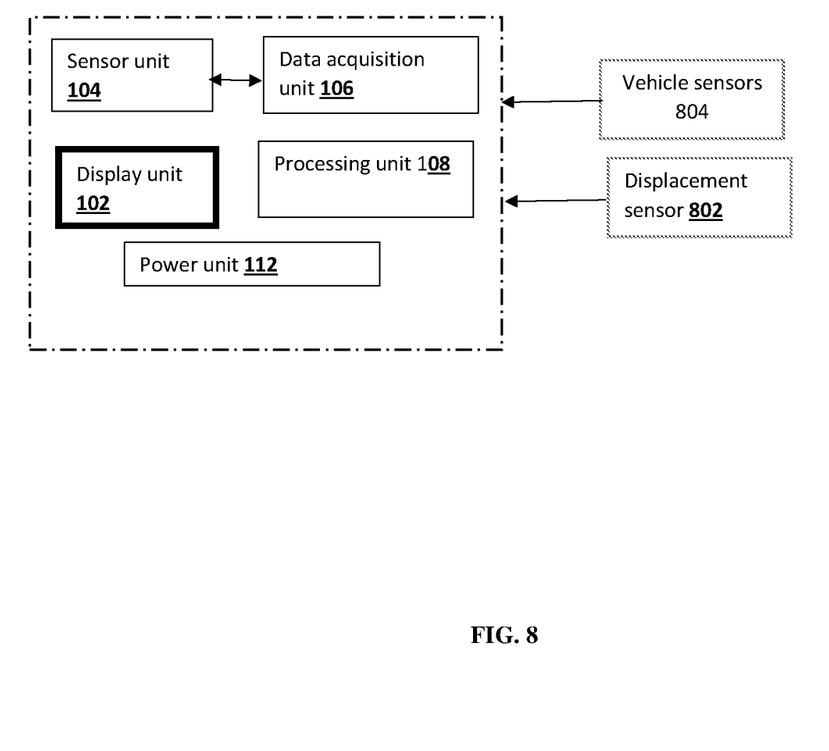
FIG. 8 illustrates an exemplary arrangement of the display unit for use as light guide in a vehicle according to the present disclosure.

FIG. 8 illustrates an exemplary arrangement of the display unit for use as light guide in a vehicle. In accordance with the example, the display unit 102 provides alerts/notifications based on the inputs received from one or more sensor, vehicle sensors 804 and displacement sensor 802. The one or more sensors 804, 802 monitors the obstacles adjacent to the vehicle and seating position of the driver. The processing unit 108 receives inputs from the one or more vehicle sensors. The inputs include obstacle detection, seating positions of driver, distance from obstacle and the like. The processing unit 108 processes the inputs to determine proximity of anterior part of the vehicle to an obstacle. When the processing unit 108 does not detect the obstacle, a first command signal is transmitted to the display unit. The first command signal includes a color indicator, a display indicator and a display location indicator. The processing unit 108 also analyses seating position of the driver seat to determine the location of display on the windshield. Depending on the seating position of the driver, the display location is determined, so that the display falls in line of the sight of the driver. The first command signal provides a blue color alert on the display unit 102. The blue color alert on display gives a clear understanding of the position of the car on the road and also the distance between the edges of the car and the obstacle in the front, by changing its color gradient. In another case, when the processing unit 108 detects the obstacle, a second command signal is transmitted to the display unit. The second command signal provides a red color alert on the display unit 102. The display unit 102 has one or more types of EL with different color embedded between the glazing to enable display in 'red', 'orange', 'blue', 'green' colors.

According to an example, the display for light guide include one or more inverted 'L' shaped, thin hairline structure representing the right and left edges virtually from the driver's viewpoint. The one or more sensors are calibrated with the pre-measured distance of the vehicle's front portion from the windshield. The processing unit is defined with a threshold value for obstacle distance. Also, optimal values for distance of the seat from the windshield and height of the seat, position of eye level range are defined in processing unit. The resultant value of the measurements shall generate data to project/illuminate the 'L shaped' guidelines on the display unit and will be adjusted automatically when the seat position is altered.

The display area of the light is auto-adjusted and is calibrated as per the position of the seat distance from the steering wheel and the height of the seat. Thus precise information about the edges in front is determined thus enabling the driver to ride, overtake, turn and park easily without a dilemma. The display area is very minimal, without interrupting the field of vision on road.

In another example, when the vehicle detects the obstacles nearby and the information is communicated to setup, depending on the location and distance of the obstacle, the blue line gradually changes its colour to green, yellow and red depending the closeness of the obstacle. Where, blue is very far, green is safe, yellow is near and red is very near. If the obstacle is located on the left, then left side guideline alone shall change its colour and same process for the right. Thus, the display unit 802 ensures that the driver to drive comfortably without any dilemma about the vehicle hitting the obstacle while turning, overtaking and parking.

In another example, a driving condition is displayed in social networking platform e.g. Facebook/Twitter post indicating that a user 'A' is driving home from office and he is frowny with the number of times he had to stop in a flyover. The user actions such as break is monitored by the sensors and calculated to estimate the status of the user based on a set of pre-defined criteria's. For example, speeding is associated with a pre-defined criteria of rash driving and corresponding alert indicators is generated by the processing unit.

Experiment

According to an embodiment, the proposed disclosure provides a processing unit that is configured to control the power output to the display unit and thereby modify the duration of illumination, frequency of illumination and luminosity of illumination. An experiment was conducted to co-relate the power output from the processing unit to the lux values in the display unit. A laminated glazing with a display unit of dimension 370 mm*70 mm was measured for lux values. Table 1 and Table 2, shows the variation in lux values of the display unit on different values of voltage and frequency supplied by the power unit.

TABLE 1

Voltage set in Variable Inverter = 300 V AC

| Frequency Reading (Hz) | Voltage Reading (V AC) | Lux |
|---|---|---|
| 99 | 204 | 155 |
| 199 | 164 | 221 |
| 400 | 140 | 240 |
| 400 | 114 | 225 |
| 500 | 134 | 227 |
| 998 | 60 | 130 |
| 1990 | 33 | 21 |

TABLE 2

Voltage set in Variable Inverter = 200 V AC

| Frequency Reading (Hz) | Voltage Reading (V AC) | Lux |
|---|---|---|
| 299 | 140 | 100 |
| 399 | 92 | 90 |
| 599 (Fluctuating Freq Observed) | 68 | 68 |
| 399 (Fluctuating Freq Observed) | 54 | 54 |
| 499 | 45 | 37—Very Slight flicker observed in lighting |
| 998 | 24 | 5—Slight flicker observed in lighting |
| 1990 | 12 | 1—Slight flicker observed in lighting |

It was observed that with increase in voltage supplied to the display unit, the lux values increase proportionally. Further, the processing unit may control the voltage signal supplied to the display unit to vary the brightness and illumination in the display unit.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The description in combination with the figures is provided to assist in understanding the teachings disclosed herein, is provided to assist in describing the teachings, and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

LIST OF ELEMENTS 106 data acquisition unit
108 processing unit
104 sensor unit
102 display unit
106 data acquisition unit
110 remote control device
116 input device
516 electroluminescent device
502a first substrate
502b second substrate
502c interlayers
502 laminated curved article 120 communication network
804 vehicle sensor
802 displacement sensor

We claim:

1. An interactive display system for a vehicle using a laminated glass, the system comprising:
   a display unit comprising one or more illumination devices sandwiched between a first substrate and a second substrate of the laminated glass, the one or more illumination devices being viewed from at least exterior of the vehicle or interior of the vehicle or both;
   a processing unit embedded on the vehicle and communicatively coupled with the display unit, wherein the processing unit is configured to receive user input from an input device;
   a data acquisition unit communicatively coupled with the processing unit, wherein the data acquisition unit is configured to receive sensor output from a sensor unit present in the vehicle, and wherein, the processing unit is configured to generate a command signal to interactively control the display unit in response to at least the user input and the output data from the sensor unit;
   a remote control device communicatively coupled to the processing unit, wherein the processing unit is configured to control the display unit and illumination of the display unit based on proximity of the remote control device to the vehicle, and wherein the processing unit comprises a power convertor that is configured to modify a voltage output in the command signal to optimize voltage conditions, and
   a server system communicatively coupled with the processing unit via a network, wherein the server system is configured to receive the command signal from the processing unit.

2. The system as claimed in claim 1, wherein the command signal is used to control display unit to display one or more patterns, emoticons, and modify illumination selectively in the one or more illumination devices.

3. The system as claimed in claim 1, wherein the command signal is configured to selectively activate or de-activate the one or more illumination devices in the display unit.

4. The system as claimed in claim 1, wherein the command signal is used to control the display unit to selectively display sensor data received from the sensor unit, and the sensor data is selected from a group of fuel indicator, temperature data, seat-belt indicator, noise level, illumination level, operative temperature, thermal comfort level, air quality, directional indicator, heater, defroster, door open status indicator, head lamp indication, EV battery indication, and a combination thereof.

5. The system as claimed in claim 1, wherein the sensor unit is located on the glazing.

6. The system as claimed in claim 1, wherein the remote control device is communicatively coupled to the display unit to control illumination of the display unit.

7. The system as claimed in claim 1, wherein the remote control device is configured to communicate with the processing unit using a wireless communication protocol.

8. The system as claimed in claim 1, comprises an input device that communicates with the processing unit to activate and de-activate the display unit, wherein the input device is a microphone, a touch sensor, and a gesture sensor.

9. The system as claimed in claim 1, wherein the processing unit comprises an engine control unit, a memory, a power convertor, a light control unit and a wireless communication module.

10. The system as claimed in claim 9, wherein the processing unit is configured to control the power output to the display unit and thereby modify the duration of illumination, frequency of illumination and luminosity of illumination; and
   the processing unit is further configured to receive sensor output data from the sensor unit to display one or more sensor output data on the display unit.

11. The system as claimed in claim 1, wherein the one or more illumination devices is one of organic light-emitting diode (OLED), light emitting diode (LED), electroluminescent display.

12. The system as claimed in claim 1, wherein the display unit is embedded on a windshield, rear window glazing, side window glazing or roof glazing of a vehicle, and is one of transparent, opaque, semi-transparent and disposed on a visible region of the windshield or disposed behind a ceramic region of the windshield.

13. The system as claimed in claim 1, wherein the processing unit displays pre-defined patterns, characters, icons/emoticons, and light guides on the display unit in response to user actions.

14. The system as claimed in claim 13, wherein the user actions comprise but not limited to acceleration, braking, gear change and voice command.

15. The system as claimed in claim 1, wherein the server system determines status of a user in response to the command signal and update the status in social networking websites linked to a user of the vehicle.

16. The system as claimed in claim 1, wherein the processing unit is configured to transmit data to the server system through a mobile application present in the remote control device.

17. The system as claimed in claim 1, wherein the sensor unit comprises one or more sensors selected from a group comprising of temperature sensor, relative air humidity sensor, air quality sensor, taximeter function sensor, location sensor, displacement sensor, obstacle detection sensor, accelerometer, alcohol sensor, Wi-Fi level sensor, illuminiscence sensor, acoustic sensor, proximity sensor, occupancy level sensor, sleepiness sensor, imaging sensor or combination thereof.

18. A method of triggering a display unit in the interactive display system in a vehicle, where the display unit comprises one or more illumination devices sandwiched between a first substrate and a second substrate of a laminated glass of the vehicle glazing, the one or more illumination devices being viewed from at least exterior of the vehicle or interior of the vehicle or both, the method comprising:
   receiving, by a data acquisition unit, an output data from a sensor unit present in the vehicle;
   transmitting the output data to a processing unit;
   receiving user inputs by the processing unit;
   generating a command signal by the processing unit in response to the user input and output data;
   triggering the display unit, by the command signal, wherein the display unit is configured to display patterns, emoticons on at least exterior of the vehicle or interior of the vehicle or both, wherein the command signal includes a voltage output which is varied to modify the luminance in the display unit;
   establishing communication of a remote control device with the processing unit to control display unit; and
   establishing communication of the processing unit with a server system through a mobile application to transmit output data from the processing unit to a server system;

wherein the step of controlling the display unit comprises controlling the amplitude of the power supplied to the display unit and thereby controlling the duration of illumination, frequency of illumination and luminosity of illumination in the display unit, wherein the processing unit controls the display unit and illumination of the display unit based on proximity of the remote control device to the vehicle, and wherein the processing unit comprises a power convertor that is configured to modify the voltage output in the command signal to optimize voltage conditions.

\* \* \* \* \*